United States Patent [19]

Gustafson et al.

[11] 4,410,263
[45] Oct. 18, 1983

[54] SHEET HANDLING DEVICE FOR IMAGE TRANSFER IN AN ELECTROGRAPHIC COPIER

[75] Inventors: Gary B. Gustafson, Hilton; Garold F. Fritz, Webster, both of N.Y.

[73] Assignee: Eastman Kodak Company, Rochester, N.Y.

[21] Appl. No.: 353,778

[22] Filed: Mar. 1, 1982

[51] Int. Cl.³ .................... G03G 15/00; G03G 15/01
[52] U.S. Cl. ................ 355/3 TR; 355/3 SH; 355/3 R; 355/14 TR; 355/4; 271/276
[58] Field of Search ........... 355/3 TR, 3 SH, 3 TE, 355/3 R, 4, 14 R, 14 TR, 14 SH; 271/204, 205, 82, 85, 196, 152, 153, 229, 231, 275, 276, 277; 118/653, 621; 101/132; 430/126; 313/299

[56] References Cited

U.S. PATENT DOCUMENTS

| | | | |
|---|---|---|---|
| 3,357,400 | 12/1967 | Manghirmalani | 118/653 |
| 3,460,472 | 8/1969 | Trumbull et al. | 101/132 |
| 3,533,618 | 10/1970 | Carstens | 271/276 |
| 3,690,756 | 9/1972 | Smith | 355/4 |
| 3,697,171 | 10/1972 | Sullivan | 430/126 |
| 3,698,805 | 10/1972 | Hickey et al. | 355/14 R |
| 3,702,412 | 11/1972 | Dolcimascolo et al. | 313/299 |
| 3,847,478 | 11/1974 | Young | 355/3 R |
| 3,917,396 | 11/1975 | Donohue et al. | 355/14 R |
| 4,024,814 | 5/1977 | Becker | 271/276 X |
| 4,025,178 | 5/1977 | Yokozawa et al. | 355/3 R |
| 4,027,960 | 6/1977 | Ladrigan | 355/3 R |
| 4,056,057 | 11/1977 | Smith | 271/276 X |
| 4,072,412 | 2/1978 | Suda et al. | 355/3 TR |
| 4,120,577 | 10/1978 | Watanabe et al. | 355/4 |
| 4,127,265 | 11/1978 | Wirz et al. | 271/277 X |
| 4,204,471 | 5/1980 | Becker | 271/277 X |
| 4,213,551 | 7/1980 | Windele | 355/3 TR X |
| 4,234,305 | 11/1980 | Miyake et al. | 355/3 SH X |

*Primary Examiner*—A. C. Prescott
*Attorney, Agent, or Firm*—Lawrence P. Kessler

[57] ABSTRACT

Apparatus for transferring seriatim related transferable images from sequentially spaced image-receiving areas on the member onto a surface of a moving receiver sheet. The transfer apparatus includes a mechanism which captures the lead and trail edges of a receiver sheet. A portion of the sheet intermediate the lead and trail edges is self-supporting. The mechanism moves to repetitively circulate a captured sheet along a path through a position at which such sheet is in transfer relation to a transferable image on the member. A charger is located adjacent to such position on the opposite side of the sheet from the member to effect transfer of the transferable images. The movement of the mechanism is synchronized with the image-receiving areas on the member to sequentially register the captured sheet accurately with the related transferable images at such position so that the images are transferred to such sheet in accurate superimposed register.

15 Claims, 9 Drawing Figures

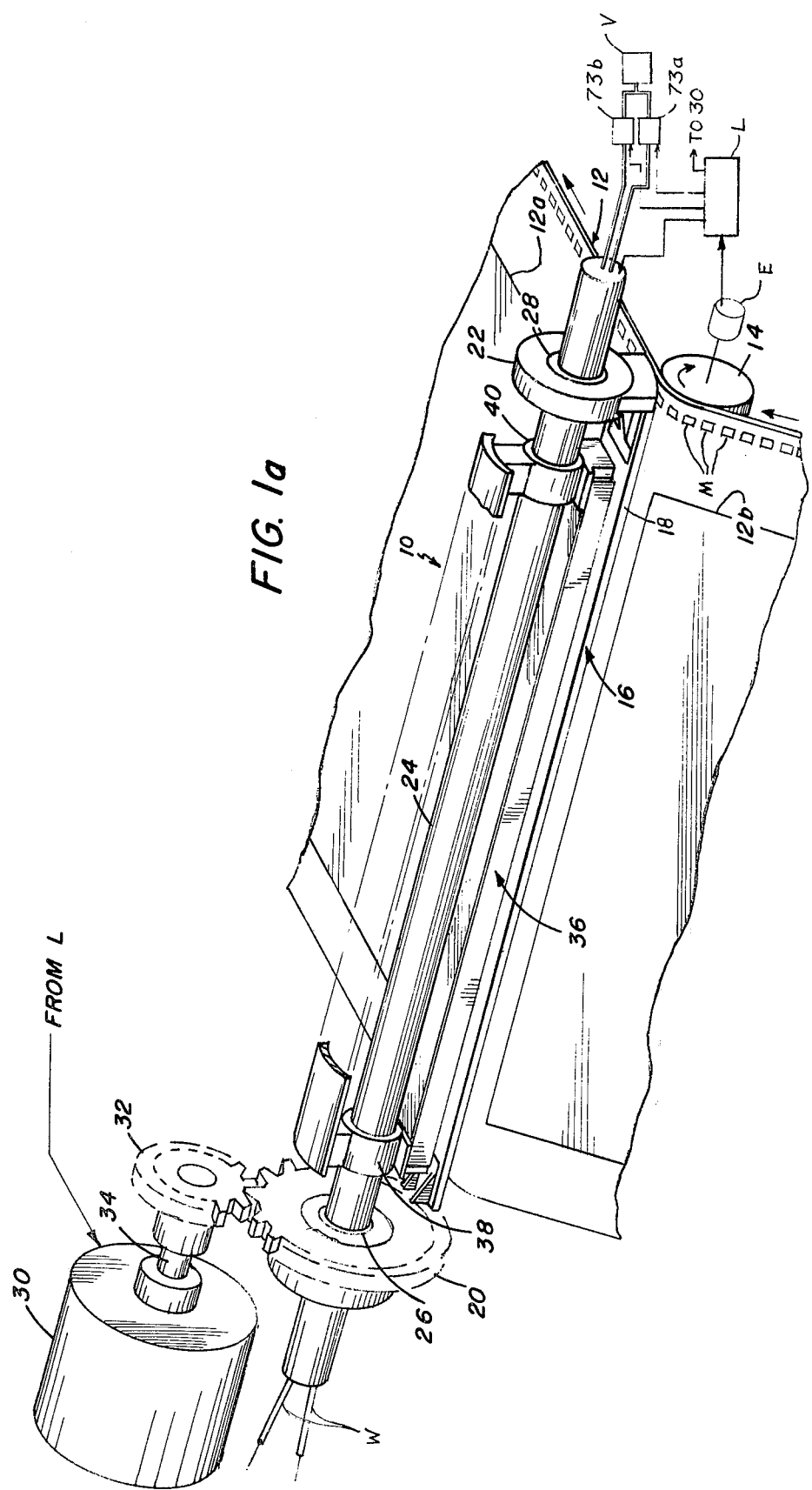

SHEET HANDLING DEVICE FOR IMAGE TRANSFER IN AN ELECTROGRAPHIC COPIER

RELATED APPLICATIONS

This application is related to commonly assigned U.S. patent application Ser. No. 353,779, filed on even date in the name of Gustafson, and U.S. patent application Ser. No. 353,780, filed on even date in the name of Holzhauser et al.

BACKGROUND OF THE INVENTION

This invention relates in general to a transfer apparatus for use in an electrographic copier, and more particularly to a corona transfer apparatus including a transporter for repetitively circulating a receiver sheet into engagement with a moving member carrying related transferable images for transfer of such images seriatim from the member to such sheet in superimposed register to form a composite reproduction.

In making multicolor reproductions with a plain paper electrophotographic copier, for example, a multicolored original document is illuminated to form color separation images. The color separation images expose a charged photoconductive member at spaced locations along the member to form latent image charge patterns on the member corresponding to the color separation images. Exposure may take place sequentially by illuminating the document three times with white light and passing the light images respectively through primary color filters (see, for example, U.S. Pat. No. 4,072,412, issued Feb. 7, 1978 in the names of Suda et al.). Alternatively, the document may be illuminated once and the light image divided into color separation images, such as by light splitters (see, for example, U.S. Pat. No. 3,690,756 issued Sept. 12, 1972 in the name of Smith) to simultaneously expose the photoconductive member. The latent image charge patterns are developed with complementary colored marking particles (toner) to form transferable images. The transferable images are transferred from the photoconductive member to a receiver sheet in registered superimposed relation to form a multicolor reproduction.

In order to transfer the transferable images to the receiver sheet in superimposed register, the receiver sheet may be gripped and moved in a path to repeatedly bring the sheet into transfer relation with the photoconductive member at a transfer station. For example, in U.S. Pat. No. 3,999,987 (issued Dec. 28, 1976 in the name of Davis et al), the receiver sheet is gripped by a transfer roller and recirculated into engagement with the photoconductive member a number of times corresponding to the number of developed images. Transfer rollers, however, have a tendency to abrade the photoconductive member and must be continuously cleaned to prevent defects in the development of the latent image charge patterns. Further, the electrical potential of the transfer roller must be accurately adjusted to accomplish optimal transfer with different receiver materials, material thicknesses, or ambient conditions.

A transfer apparatus having a corona transfer charger overcomes the described disadvantages of transfer rollers. However, while a corona transfer charger provides a uniform transfer field, the mechanism for gripping the receiver sheet to repeatedly bring the sheet into transfer relation with the photoconductive member has been of complex construction; see, for example, the above-mentioned U.S. Pat. No. 4,072,412. The complexity results, in part, from the necessity of adequately supporting the receiver sheet without blocking the field of the charger relative to the sheet at the transfer location. Furthermore, with the known transfer apparatus using a corona transfer charger, the receiver sheet support has confined the sheet such that the sheet does not have freedom to conform to the photoconductive member during transfer. This may induce positional misregistration between subsequent transferable images transferred to such sheet so that the images are not in accurate superimposed register.

SUMMARY OF THE INVENTION

This invention is directed to apparatus for transferring seriatim related transferable images from sequentially spaced image-receiving areas on the member onto a surface of a moving re- ceiver sheet. The transfer apparatus includes a mechanism which captures the lead and trail edges of a receiver sheet. A portion of the sheet intermediate the lead and trail edges is self-supporting. The mechanism moves to repetitively circulate a captured sheet along a path through a position at which such sheet is in transfer relation to a transferable image on the member. A charger is located adjacent to such position on the opposite side of the sheet from the member to effect transfer of the transferable images. The movement of the mechanism is synchronized with the image-receiving areas on the member to sequentially register the captured sheet accurately with the related transferable images at such position so that the images are transferred to such sheet in accurate superimposed register.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which:

FIG. 1a is a view, in perspective, of a transfer apparatus according to this invention particularly showing the tow bar structure and its drive, with portions being broken away or removed to facilitate viewing;

FIG. 2 is an end view, partially in cross-section, of the transfer apparatus of FIG. 1a.

DESCRIPTION OF THE PREFERRED EMBODIMENT

Figure 1:
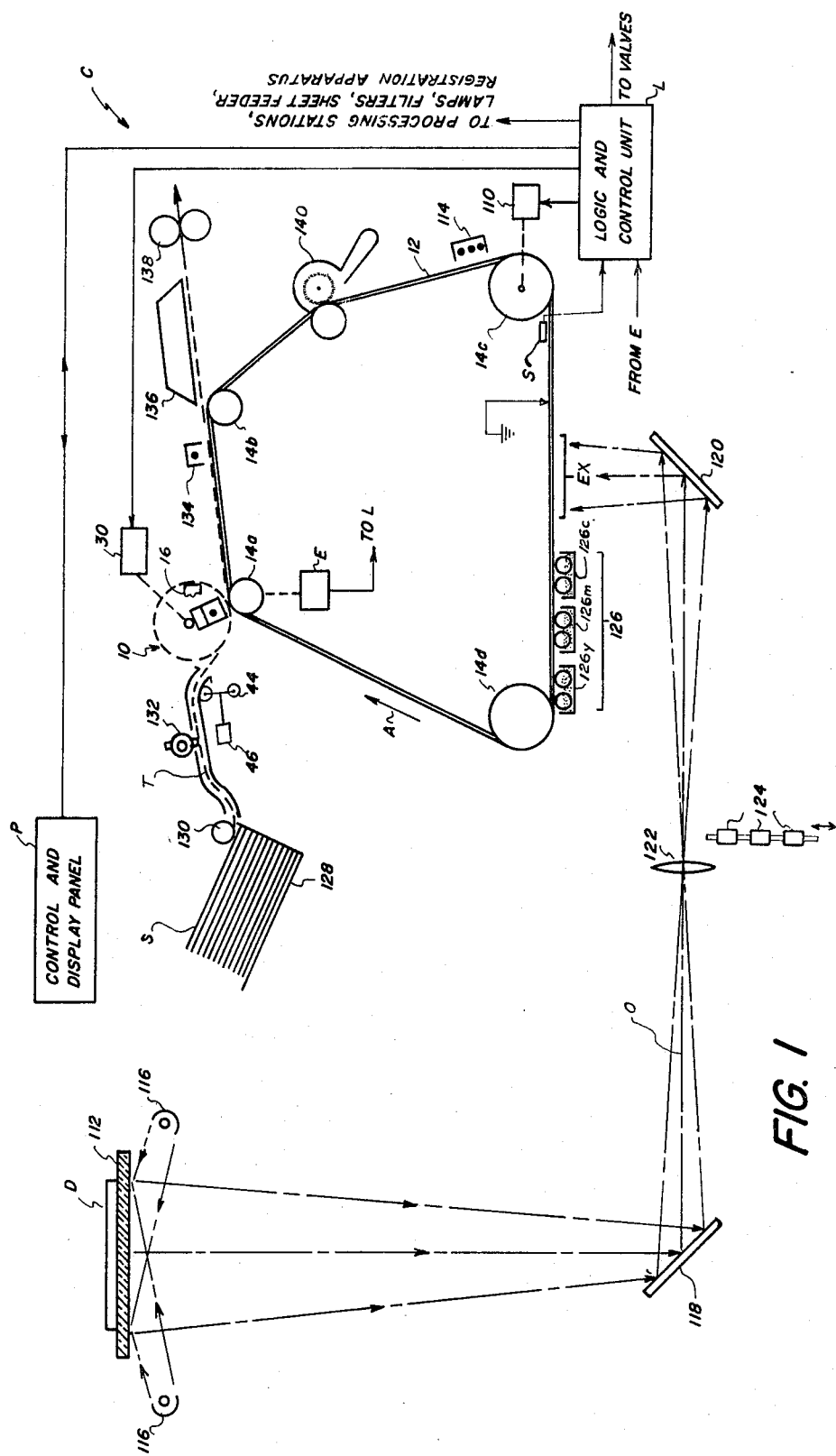
FIG. 1 is a schematic illustration of an electrophotographic copier including a transfer apparatus according to this invention.

Referring now to the drawings, a transfer apparatus, according to this invention, is designated generally by the numeral 10. The transfer apparatus 10 of this invention is hereinafter illustratively described with relation to an electrophotographic copier for making color reproductions formed by accurate transfer of superimposed related transferable images corresponding to color separation images of input information from an image-carrying member to a receiver sheet. The accurate superimposed transfer of such related images, provided by the transfer apparatus 10, is important for forming a faithful color reproduction. Of course, this invention would also be useful for making monochrome reproductions formed by transfer of a plurality of related transferable images of a single color where accurate superimposed transfer is important.

As shown in FIG. 1, the transfer apparatus 10 is located in juxtaposition with a grounded photoconductive member (web) 12 of an electrophotographic copier apparatus C. The web, which includes sequentially spaced image-receiving areas (e.g., areas 12a, 12b of FIG. 1a), is for example of the type disclosed in U.S. Pat. No. 3,615,414 issued Oct. 26, 1971 in the name of Light. Of course, it is within the scope of this invention that the member could take the form of a photoconductive drum or a plurality of discrete sheets of photoconductive material. Rollers 14a-14d support the web for travel about a closed loop path. A motor 110, controlled by a copier logic and control unit L, is operatively coupled to roller 14c to move the web 12 about its path in the direction of arrow A through various electrophotographic processing stations. The processing stations are also controlled by the unit L which includes, for example, an Intel 8080 microprocessor available from Intel Corporation of Sacremento, Calif. A series of marks or perforations M (see FIG. 1a) on the web associated with the image-receiving areas are detected by a sensor S which provides signals indicative of such detection. The sensor is operatively coupled to the unit L to enable the unit to monitor the location of image-receiving areas of the web as the web travels about its path. The unit L controls the timing of operation for the processing stations in response to the location of the image-receiving areas.

In a typical electrophotographic processing cycle, a document D is placed, information side down, on a transparent platen 112. The operator selects the desired number of copies and initiates the cycle by depressing appropriate buttons on the control and display panel P. Control signals produced in the panel P are sent to the logic and control unit L which, in turn, starts the motor 110 and effects operation of the processing stations. The photoconductive web 12 is moved under a primary charger 114 which places a uniform electrostatic charge on the web. As a charged image-receiving area of the web arrives at the exposure station EX, the unit L turns on flash lamps 116 to illuminate the document to generate a reflected light image of the document D. A reflected light image of the document is directed along optical path O to the exposure station EX by mirrors 118, 120 and lens 122, in register with the image-receiving area of the web to expose such area. Exposure selectively reduces the charge on the photoconductive web 12 leaving an electrostatic latent image charge pattern in the image-receiving area corresponding to the reflected light image. Of course, the exposure could alternatively be accomplished by electronically produced images formed by LED's (light emitting diodes) or fiber optic arrays, or by raster, laser or flying spot scanners directed at the image-receiving areas. Further, the web could be an insulating member having electrical charge induced electrostatic charge patterns or a ferromagnetic member having magnetically produced patterns.

After exposure the web 12 moves past development station 126. When multicolor reproductions are to be made by the copier C, the development station comprises three development mechanisms such as magnetic brush assemblies 126c, 126m, and 126y for example. With the subtractive color reproduction process, the magnetic brush assemblies respectively contain complementary primary color marking particles (cyan, magenta, and yellow). The particles exhibit a triboelectric charge opposite to the electrostatic charge on the photoconductive web 12 so that the particles are attracted to the web. With the use of three magnetic brush assemblies for development, the lamps 116 are flashed three times and the three reflected images are directed to the exposure station through primary color (red, green, and blue) filters 124r, 124g, 124b respectively inserted into the optical path O. The timing of the flashes and insertion of the filters are controlled by the logic and control unit L such that the images expose successive image-receiving areas of the web 12, arriving at the exposure station EX, to form spaced latent image charge patterns respectively corresponding to color separation images of the document D. The unit L then controls operation of the magnetic brush assemblies so that the latent image charge patterns are developed only with respective complementary colored marking particles to form transferable images. Of course, a fourth development station containing black marking particles may be provided for developing a latent image corresponding to a document having only black copy, or that portion of a multi-color document which is black, exposed through a neutral density filter for example.

The copier C has a sheet supply hopper 128 containing a stack S of receiver sheets, such as bond paper or transparency material. A sheet feed mechanism 130, such as an oscillating vacuum feeder, for example, is located in juxtaposition with the sheet stack to feed the topmost sheet into the transport path indicated by the broken line T. The mechanism 130 is operatively connected to the logic and control unit L so that such sheet is fed in timed relation to the travel of the first transferable image carried on the web 12. A registration apparatus 132 (such as that shown in U.S. Pat. No. 4,019,732 issued Apr. 26, 1977 in the names of Hunt et al), located in the path T squares up the receiver sheet relative to the transfer apparatus 10. Additionally, apparatus 132 is operatively associated with the logic and control unit L. The unit L controls operation of the apparatus 132 to provide any timing correction required to insure that the sheet reaches the apparatus in accurate relation to the first transferable image.

Figure 2:
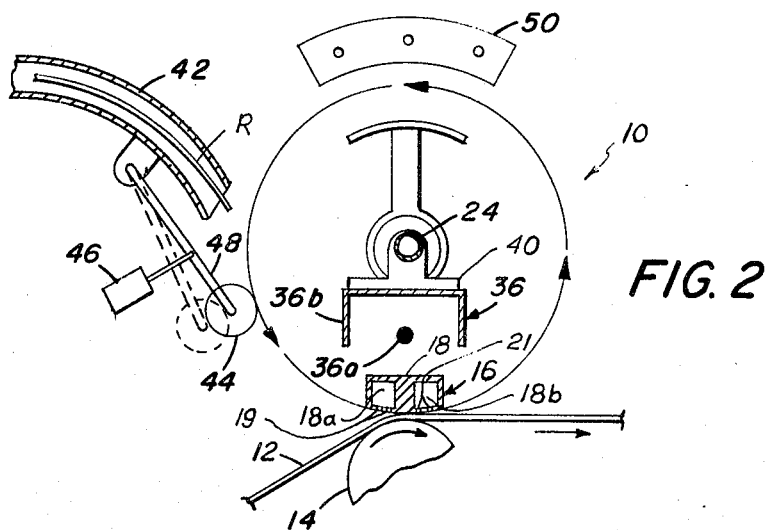

The transfer apparatus 10 includes a receiver sheet gripper 16 and a corona transfer charger 36 (see FIGS. 1a and 2). The gripper 16 comprises a tow bar 18 which captures the lead and trail edges of a receiver sheet. The portion of the sheet intermediate the captured edges is self-supporting. The tow bar is supported on a stationary hollow shaft 24. The shaft 24 is located within the copier in spaced parallel relation to the plane of the photoconductive web 12 and perpendicular to the direction of travel of the web. A gear 20 and hub 22 are respectively journaled on the stationary hollow shaft 24 through bearings 26, 28. The two bar is connected at one end to the gear 20 and at the opposite end to the hub 22 so as to be parallel to the longitudinal axis of the shaft 24. A stepper motor 30, supported within the copier, has a gear 32 fixed on the output shaft 34 of the motor in mating engagement with gear 20. When the stepper motor 30 is turned on by the logic and control unit L, it drives the tow bar 18 in stepped increments in a circular path about the longitudinal axis of shaft 24 (see FIGS. 1 or 2). The tow bar is spaced from the shaft 24 such that a captured receiver sheet contacts the web 12 under the charger 36 as the tow bar is driven.

The corona transfer charger 36 (such as that shown in U.S. Pat. No. 3,122,634 issued Feb. 25, 1964 in the name of King) is mounted on the shaft 24 by brackets 38, 40 in spaced parallel relation to the plane of the photoconductive web 12 and perpendicular to the web travel path. The length of the charger is selected to span the dimension of the image-receiving area perpendicular to the web travel path. Wires W, connected to a DC or biased AC electrical potential source (not shown) pass through the shaft 24 and are connected to a corona wire 36a (see FIG. 2) of the charger 36 to generate a transfer corona. A shield 36b directs the corona at the area of contact between the captured receiver sheet and web 12. The electrical potential source applies a potential to the corona wire 36a to charge the receiver sheet. The charge on the sheet is of the same polarity but substantially greater absolute value than the charge on the web attracting the marking particles to the web. Accordingly, the transfer corona is effective to overcome such attraction and transfer a transferable image line-by-line from the moving web to the moving receiver sheet during the time the sheet is in contact with the web.

Figure 3A:
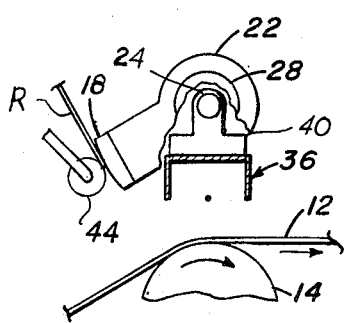
FIGS. 3a through 3f are schematic end views, similar to FIG. 2, of a transfer apparatus according to this invention at sequential stages of operation.
Figure 3B:
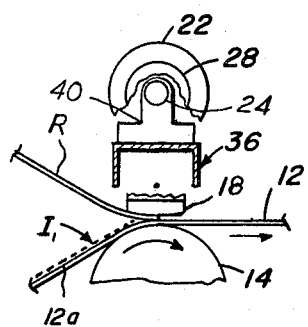
Figure 3C:
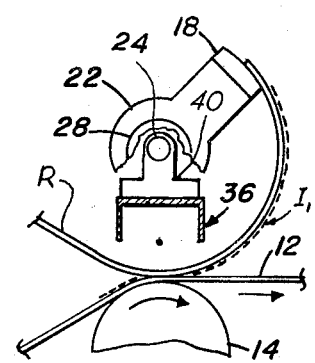

The receiver sheet (e.g., sheet R of FIG. 2), transported along the path T, is directed toward the gripper 16 by a guide 42. The logic and control unit L for the copier actuates the stepper motor 30 such that at substantially the same time as the lead edge of the sheet intersects the path of the tow bar (rotated counterclockwise in FIGS. 1, 2 and 3a–3f), the tow bar arrives at the point of intersection. A plurality of rollers 44 are supported by a plurality of pivoting arms 48 respectively (only one shown) adjacent to the transfer apparatus 10 across the path of travel of the receiver sheet. A solenoid 46, connected to pivoting arms 48, is actuated by the logic and control unit L to move the rollers to the solid line position of FIG. 2 or FIG. 3a for guiding the receiver sheet R into contact with the tow bar.

The tow bar 18 includes a vacuum plenum 18a (FIG. 2) connected to a vacuum source V by a conduit through a valve 73a (FIG. 1a). The plenum 18a has ports 19 through the wall contacted by the receiver sheet. The valve 73a is controlled by the logic and control control unit L to apply vacuum to plenum 18a as the receiver sheet comes in contact with the plenum wall to effect capture of the lead edge of the sheet by vacuum tacking of the lead edge to the plenum wall. The application of vacuum is maintained as the tow bar rotates to keep the lead edge captured by the tow bar. Once the lead edge is captured, the logic and control unit L deactuates the solenoid 46 to return the rollers 44 to the broken line position of FIG. 2. After lead edge is captured, stepper motor 30 drives the tow bar to bring the lead edge of the sheet into engagement with the web 12 in timed relation to movement of the web. Thus, the lead edge of the sheet and the lead edge of the image-receiving area carrying a transferable image (e.g., area 12a carrying image I₁ of FIG. 3b) arrive under the transfer corona charger 36 at subtantially the same time. The dimension of the plenum 18a is selected such that the captured portion of the lead edge of the sheet falls in the margin of an image-receiving area so that no information is lost during transfer.

Continued rotation of the tow bar 18 about its path removes the lead edge of the receiver sheet from contact with the web. However, the normal beam strength of the receiver sheet and the electrostatic forces between the sheet and the grounded web cause following successive elements of the sheet to contact the web under the charger 36. The corona charge thus effectively acts on the sheet, which is substantially free to conform to the web, to efficiently transfer the transferable marking particle image I₁ to the sheet (see FIG. 3c). The tangential velocity of the tow bar 18 is controlled by the stepper motor 30 to substantially match the peripheral speed of the web 12. Therefore, there is no relative movement between the sheet and the transferable image so that smearing during transfer is prevented. The linear distance of travel for a captured receiver sheet is selected to exactly match the linear dimension of an image-receiving area on the web plus the interframe dimension (in direction of web travel). Accordingly, when the lead edge of the receiver sheet R is returned to engagement with the web, it is in register with the lead edge of the next image-receiving area on the web (e.g., area 12b carrying image I₂ of FIG. 3d). As the receiver sheet traverses its path under the influence of the tow bar 18, it passes an AC charger 50 (see FIG. 2) which provides a neutralizing charge to remove any charge on the sheet in order to facilitate subsequent transfers induced by the charger 36.

A shaft encoder E is operatively associated with the web support roller 14a. The encoder produces signals indicative of the angular position of the roller due to movement of the web 12. Such signals are fed to the logic and control unit L where they are compared with image-receiving area location signals from the sensor S. Such comparison is used to determine whether a particular image-receiving area will reach the transfer station at the proper time relative to the arrival of the captured receiver sheet carried by the tow bar 18. If there is any positional deviation between the image-receiving area and the captured receiver sheet which would result in a non-registered transfer, the logic and control unit L adjusts the action of the stepper motor 30 during the passage of the interframe area beneath the charger 36 to eliminate such deviation. Such adjustment comprises adding or subtracting steps relative to a predetermined number of steps which are normally required for proper positioning of the receiver sheet relative to the image-receiving area. By such adjustment, relative movement between the receiver sheet and the web occurs at the interframe so that there is no image smearing as would occur if adjustment were made during transfer.

Figures 3D, 3E, 3F:
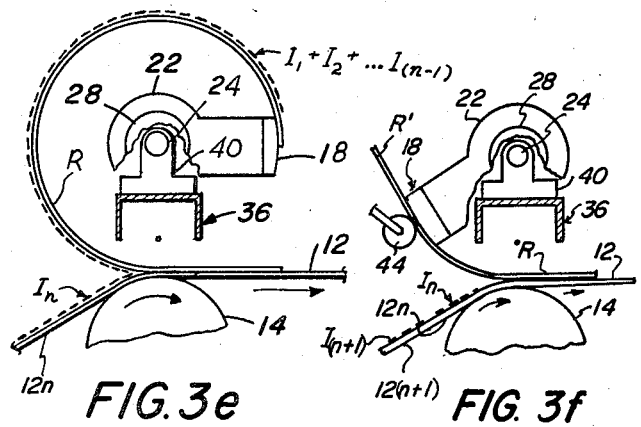

As the tow bar 18 returns the lead edge of the receiver sheet into engagement with the web, the trail edge of the sheet, in transfer relation with image I₁ in area 12a, is in juxtaposition with the lead edge and is contacted by the tow bar for capture (see FIG. 3d). Capturing of the trail edge is accomplished by vacuum tacking of the trail edge to a vacuum plenum 18b of the tow bar. The plenum 18b, which has ports 21 through the wall contacted by the receiver sheet, is connected through a conduit to the vacuum source V through valve 73d. The valve 73b is controlled by the logic and control unit L, in a manner similar to that described for valve 73a, to effect trail edge capture. The tow bar continues its rotation the number of times corresponding to the number of related transferable images remaining on web 12 for one complete reproduction of a particular document. With the lead and trail edges of the receiver sheet captured by the tow bar 18, the intermediate portion forms a self-supporting compliant loop. The beam strength of the sheet maintains the compliant loop so that successive elements of the sheet loop conformably contact the web under the transfer corona 36 during each of the subsequent transfers of transferable images through image $I_{(n-1)}$. During rotation, power is maintained to the corona charger 36 to effect transfer of the transferable images seriatim to the sheet.

As the transfer of the last image $I_n$ from area 12n is initiated (tow bar 18 in the same position as shown in FIG. 3d), the vacuum to plenum 18a is interrupted by unit L closing the valve 73a. The lead edge of the receiver sheet R is thus released and follows the path of the web 12 (see FIG. 3e) toward a downstream location. As is the case during the first image transfer, the normal beam strength of the receiver sheet and the electrostatic forces between the sheet and the grounded web cause following successive elements of the sheet to conform to the web at contact under the charger, with the sheet traveling at a peripheral speed equal to that of the web. Transfer of image $I_n$ is accordingly accomplished in accurate superimposed register. When the last transfer is completed to form a composite multicolor reproduction of the original multicolor document (tow bar 18 has returned to the position shown in FIG. 3d), the logic and control unit L closes the valve 73d so that the trail edge of the receiver sheet R is released. The sheet is thus free to be transported to the downstream location. At such location, the sheet is detacked from the web, such as by an AC detack charger 134 (see FIG. 1). The sheet is then transported by apparatus 136 to a fuser 138 for permanently fixing the superimposed transferred images to the sheet, such as by heat and pressure for example. Alternatively, the tow bar 18 could be used to effect detack by delaying respective release of the lead and trail edges of the receiver sheet for some angle of rotation downstream of the transfer corona 36, with the transport apparatus 136 adjacent to the tow bar. The receiver sheet may thus be positively detacked and transported away from the web at an angle relative thereto toward a fuser apparatus. Concurrently with receiver sheet detack, the web 12 continues to be moved along its travel path past a cleaning apparatus 140 where any residual marking particles are removed prior to recharging of the web for a subsequent processing cycle.

The subsequent processing cycles may be for making multiple reproductions of the document D, or for copying a different document placed on the platen 112. In either instance the copier C again functions in the above described manner. To fully utilize the production capabilities of the copier, the first image of the subsequent processing cycle may be exposed and developed in the image-receiving area immediately adjacent to the last image-receiving area of the previous copy cycle (e.g., image $I_{(n+1)}$ in area $12_{(n+1)}$, see FIG. 3f). The feed of a receiver sheet R' is initiated by the logic and control unit L so that the lead edge of the sheet is captured by the tow bar 18 adjacent to the trail edge of sheet R. Actuation of the solenoid 46 is timed by the unit L to position the rollers 44 to guide sheet R' into contact with the tow bar for lead edge capture. The timing of such actuation is selected so that the rollers do not contact the transferred images on sheet R thereby preventing possible smearing of such images. Thus the transfer operation may continue without the necessity of skipping any of the image-receiving areas of the web 12.

The invention has been described in detail with particular reference to a preferred embodiment thereof, but it will be understood that variations and modifications can be effected within the spirit and scope of the invention.

We claim:

1. Apparatus for transferring seriatim, related transferable images from sequentially spaced image-receiving areas on a member onto a surface of a moving receiver sheet, said apparatus comprising:
    means for capturing the lead and trail edges of a receiver sheet so that a portion of the sheet intermediate the lead and trail edges is self-supporting;
    means for driving said capturing means to repetitively move a captured sheet along a path through a position at which the self-supporting portion of the captured sheet is in transfer relation to a transferable image on said member;
    charging means located adjacent to said position, on the opposite side of such sheet from said member, for applying a charge to such sheet to effect transfer of transferable images from said member to a surface of a captured receiver sheet; and
    means for synchronizing the movement of said driving means with the image-receiving areas on said member to sequentially register the captured sheet with the related transferable images at said position so that such images are transferred to the receiver sheet in accurate superimposed register.

2. The invention of claim 1 wherein said capturing means comprises ported tow means adapted to be operatively connected to a vacuum source, and means for selectively applying vacuum from such source to said tow means to tack the lead and trail edges of a receiver sheet to said tow means.

3. The invention of claim 1 wherein said capturing means comprises a tow bar including an elongated housing positioned across the path described by movement of the receiver sheet, said housing having spaced first and second plenums, said plenums respectively defining a plurality of ports in juxtaposition with such path, and means, adapted to be operatively connected to a vacuum source, for selectively applying vacuum to said respective plenums to tack the lead edge and the trail edge of such sheet to said tow bar.

4. The invention of claim 3 wherein said second plenum is spaced from said first plenum in an upstream direction, measured along the path of said tow bar, a distance substantially equal to the corresponding dimension of an image-receiving area.

5. Apparatus for transferring seriatim, related transferable images from sequentially spaced image-receiving areas on a moving member onto a surface of a moving receiver sheet, said apparatus comprising:
    a tow bar;
    means, operatively associated with said tow bar, for tacking the lead and trail edges of a receiver sheet to said tow bar so that a portion of the sheet intermediate the lead and trail edges is self-supporting;
    means supporting said tow bar for movement along an endless path through a transfer position at which the self-supporting portion of such sheet is in transfer relation to a transferable image on said member;
    means for driving said tow bar to repetitively move said two bar along said path;
    a corona charger supported by said tow bar supporting means adjacent to said transfer position, on the opposite side of a tacked receiver sheet from said member for applying a charge to such sheet to effect transfer of transferable images from said member to a surface of a tacked receiver sheet; and
    means for synchronizing the movement of said tow bar with the movement of said member to sequentially register the tacked sheet with the related transferable images at said transfer position so that such images are transferred to the receiver sheet in accurate superimposed register.

6. The invention of claim 5 wherein said tow bar supporting means comprises a shaft having a longitudinal axis located in spaced parallel relation to said member, means on said shaft and connected to said tow bar for spacing said tow bar from said shaft a distance substantially equal to the distance of said shaft from said member, and wherein said drive means rotates said tow bar about the longitudinal axis of said shaft to move a tacked receiver sheet into contact with said member at said transfer position.

7. The invention of claim 5 wherein said synchronizing means comprises means for monitoring the location of image-receiving areas on said moving member and for providing signals indicative thereof, and logic and control means responsive to such signals and operatively coupled to said tacking means, said driving means, and said corona charger for actuating such means in timed relation to effect transfer of such transferable images in superimposed register to a tacked receiver sheet.

8. The invention of claim 7 wherein said synchronizing means further includes means prividing a signal indicative of the location of an image-receiving area at said transfer position; and wherein said logic and control means includes means responsive to such location signal for comparing such signal to the monitored image-receiving area location signal to determine if there is any positional deviation therebetween which would result in a non-registered transfer of the image in such area to the tacked receiver sheet, and means responsive to any determined deviation for adjusting the actuation of said driving means between transfers so that such deviation is eliminated and transfer of such related transferable images occurs in accurate superimposed register.

9. Electrophotographic copier apparatus for making a multicolor reproduction of multicolor original input information on a receiver sheet, said apparatus comprising:
   a moving photoconductive member having spaced image-receiving areas;
   means for uniformly charging such spaced image-receiving areas;
   means for monitoring the location of such image-receiving areas and providing signals indicative thereof;
   means for exposing sequential image-receiving areas with related color separation images of original input information respectively to form latent image charge patterns in such areas;
   means for developing the latent image charge patterns with complementary colored marking particles to form transferable images corresponding to the color separation images respectively;
   means for selectively capturing the lead and trail edges of a receiver sheet to support such sheet so that a portion of the sheet intermediate the lead and trail edges is self-supporting;
   means for driving said capturing means to move a captured sheet repetitively along a path through a transfer position at which the self-supporting portion of the captured sheet is in transfer relation to a transferable image on said photoconductive member;
   a charger located adjacent to said transfer position, on the opposite side of such sheet from said photoconductive member, said charger producing an electrostatic charge of substantially greater magnitude than that on said member to effect transfer of transferable images from said member to a surface of a captured receiver sheet;
   means operatively associated with said image-receiving area monitoring means for synchronizing movement of said capturing means by said drive means with movement of said photoconductive member to sequentially register the captured sheet with such transferable images seriatim at said transfer position so that when such images are transferred to such sheet a multicolor reproduction of the original input information is formed.

10. The invention of claim 9 wherein said capturing means comprises a ported tow bar adapted to be operatively connected to a vacuum source, and means for selectively applying vacuum from such source to said tow bar to tack the lead and trail edges of a receiver sheet to said tow bar.

11. The invention of claim 9 wherein said means for driving said capturing means comprises a shaft having a longitudinal axis located in spaced parallel relation to said member adjacent to said charger, means on said shaft and connected to said capturing means for spacing said capturing means from said shaft a distance substantially equal to the distance of said shaft from said member, and means for rotating said spacing means about the longitudinal axis of said shaft to move a captured receiver sheet into contact with said member at said transfer position.

12. The invention of claim 11 wherein said synchronizing means further includes means providing a signal indicative of the location of an image-receiving area at said transfer position, means for comparing such location signal and the monitored location signal of such image-receiving area to determine if there is any positional deviation therebetween which would result in a non-registered transfer of a transferable image in such area to the captured receiver sheet, and means responsive to any determined positional deviation for adjusting said rotation means between transfers so that such deviation is eliminated and transfer of such images occurs in accurate superimposed register.

13. In an electrophotographic copier apparatus wherein related transferable images are formed on spaced areas of a moving photoconductive member, a method for transferring seriatim such images from the photoconductive member to a receiver sheet in accurate superimposed register, said method comprising the steps of:
   capturing the lead and trail edges of a receiver sheet so that a portion of the sheet intermediate the lead and trail edges is self-supporting;
   moving the captured sheet repetitively through a transfer position at which the self-supporting portion of the captured sheet is in transfer relation to a transferable image on the photoconductive member;
   synchronizing the moving of the captured sheet with the movement of the photoconductive member to sequentially register the captured sheet with the related transferable images at said transfer position; and transferring seriatim the related transferable images from the photoconductive member in accurate superimposed register to such captured sheet.

14. The invention of claim 13 wherein said synchronizing step includes correcting movement of the captured sheet, between transfers of sequential related transferable images, for any positional deviation of transferable images at said transfer position.

15. The invention of claim 13 further including the steps of:
   releasing the captured sheet following transfer of the final one of the related transferable images; and
   fusing the transferred images to the sheet whereby the composite of the transferred images is rendered permanent.

* * * * *